UNITED STATES PATENT OFFICE 1,991,509

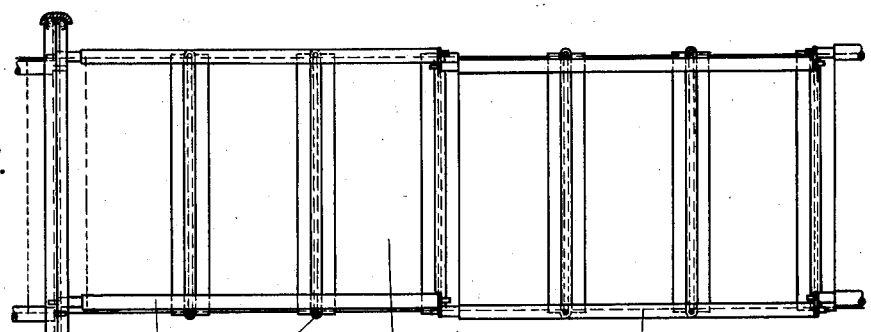
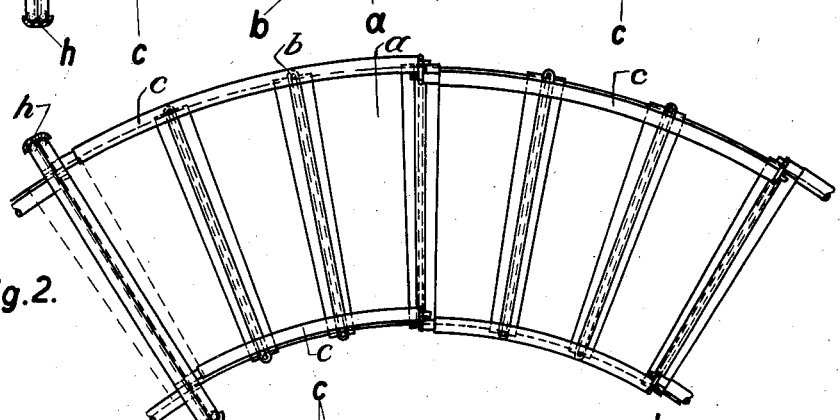
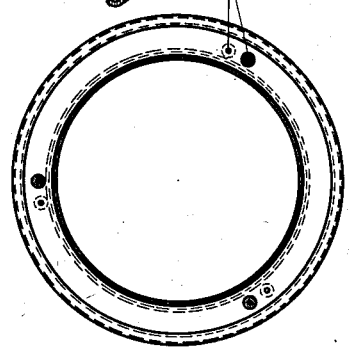
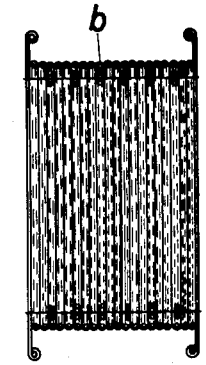
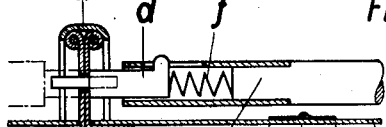
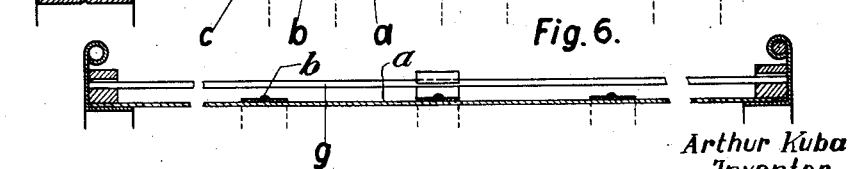

COLLAPSIBLE PIPE AND PNEUMATIC TRANSMISSION

Arthur Kuballe, Mannheim, Germany, assignor to Heinrich Lanz Aktiengesellschaft, Mannheim, Germany, a corporation Application May 12, 1934, Serial No. 725,288
In Germany June 15, 1933

4 Claims. (Cl. 137—90)

This invention relates to a pipe or conduit, of the collapsible type, for the transmission of fluid such, for example, as compressed air; and the object thereof is to provide a tubular pipe which when extended is so stiffened and tensioned that no changes in its cross-sectional areas can take place and which is not only collapsible, for space-saving storage and transportation, but can be easily extended and conveniently and rapidly laid.

The known collapsible pipes for the users in question are, it is true, easily transportable, but they have the great disadvantage that they cannot be laid in a stiff or rigid form, with the result that there occur such irregularities in cross-section as to cause large pressure losses and produce obstructions which may lead to disturbances in operation. The tubular pipes of fabric with spirally coiled insertions, on the other hand, are not only both heavy and expensive but are also unsuitable for pneumatic transmission.

My present invention, by which I have obviated the above-mentioned defects, consists, briefly stated, in a collapsible pipe, of fabric or other suitable material, provided with rings which are fixed thereon at spaced intervals throughout its length and which when the pipe is to be used are stretched apart and held stretched apart by a number or series of longitudinal members inserted between them or groups of them.

Both the number of the rings and the distance apart at which they are placed depends upon the length and diameter of the pipe; and the longitudinal members, in the form of rods of wood, cane, light metal or the like, are of such character and so arranged that, when inserted between the rings, the pipe will be stretched and kept under tension from ring to ring. To this end, the rods—for instance rods with outwardly spring-pressed pins mounted at their ends, or rods made of yielding resilient material such, for example, as ash wood—are sprung into position under tension between the rings, and are there held in place by the usual or by any suitable means, thus forcing the rings apart and thereby stretching the fabric of the pipe. For a curved pipe, the material therefor is simply cut to the radius of the desired curve, and the rings are fixed thereon at intervals and are held pressed apart by stretcher rods, as in the case of the straight pipe. The pipe sections when completed and extended can be joined together, to form a single continuous conduit, by means of the usual clips, screw connections, or the like. The laying of the pipe is an extremely simple matter, because of its light weight and the ease with which it can be handled, and on removal of the stretcher rods the pipe can be collapsed into a short length which requires little space for storage and transportation.

The invention will be understood by reference to the accompanying drawing, in which—

Figure 1 is a view showing, in side elevation, broken lengths of a straight pipe embodying my improvements; Fig. 2 is a similar view of a curved pipe; Fig. 3 is a view of the pipe in cross section; Fig. 4 is a view, in side elevation, showing the pipe collapsed; Fig. 5 and 6 are details, partly in side elevation and partly in section, of a stretcher rod and showing the adjacent wall of the pipe and the rings fixed thereon, showing by way of example two different forms of the stretcher rods and the means by which the same are held clamped in place between the rings to stretch the pipe.

As here shown, $a$ indicates the pipe, made as stated of cloth or other suitable material; $b$, $b$ indicate the rings fastened thereon, and $c$, $c$ indicate the longitudinal members or stretcher rods. In the form shown in Fig. 5, each member $c$ is a stiff rod which has mounted at each of its ends a sliding block $d$ pressed outwardly by a spring $f$ and carrying at its outer end a projecting pin adapted to fit into a hole provided therefor in the flange of a ring. In its modified form, as shown in Fig. 6, this stretcher member is a rod $g$ of yielding resilient material, such as ash wood, which at each end is sprung into a hole in a block bearing against the flange of a ring. A clip by which the ends of two sections of pipe are joined is indicated at $h$, Fig. 5.

It is to be understood that the embodiment of my improvements hereinabove described is illustrative only and that the invention can be modified in its several details, within the scope of the appended claims, without departing from the spirit or sacrificing the substantial advantages thereof.

What I claim as new, and desire to secure by Letters Patent, is—

1. A collapsible pipe of the character described, comprising a pipe of suitable material, rings surrounding the pipe and affixed thereto at spaced intervals, and a plurality of removable longitudinal members by which said rings are held stretched apart.

2. A collapsible pipe according to claim 1, in which the longitudinal members have mounted at each end an outwardly spring-pressed pin block.

3. A collapsible pipe according to claim 1, in which the longitudinal members are of a yielding resilient material.

4. A collapsible pipe according to claim 1, in which the longitudinal members are rods of ash or similar wood.

ARTHUR KUBALLE.